United States Patent
Turnbull et al.

(10) Patent No.: US 10,382,080 B2
(45) Date of Patent: Aug. 13, 2019

(54) POWER SUPPLY FOR VEHICLE BASED TRAINABLE TRANSCEIVER

(71) Applicant: GENTEX CORPORATION, Zeeland, MI (US)

(72) Inventors: Robert R. Turnbull, Holland, MI (US); Ethan J. Lee, Byron Center, MI (US)

(*) Notice: Subject to any disclaimer, the term of this patent is extended or adjusted under 35 U.S.C. 154(b) by 353 days.

(21) Appl. No.: 14/818,963

(22) Filed: Aug. 5, 2015

(65) Prior Publication Data
US 2016/0043762 A1    Feb. 11, 2016

Related U.S. Application Data

(60) Provisional application No. 62/034,094, filed on Aug. 6, 2014.

(51) Int. Cl.
| | |
|---|---|
| *H04B 1/3822* | (2015.01) |
| *G05B 13/02* | (2006.01) |
| *G05F 1/66* | (2006.01) |
| *H02J 7/00* | (2006.01) |

(52) U.S. Cl.
CPC ....... *H04B 1/3822* (2013.01); *G05B 13/0265* (2013.01); *G05F 1/66* (2013.01); *H02J 7/0063* (2013.01); *H02J 2007/0067* (2013.01)

(58) Field of Classification Search
CPC ..... G05B 13/0265; G05F 1/66; H04B 1/3822; H02J 2007/0067; H02J 7/0063
See application file for complete search history.

(56) References Cited

U.S. PATENT DOCUMENTS

| | | | |
|---|---|---|---|
| 6,370,046 B1* | 4/2002 | Nebrigic | H02M 3/07 327/536 |
| 6,442,052 B1* | 8/2002 | Hemena | H02M 3/33569 363/56.12 |
| 2001/0024313 A1 | 9/2001 | Bauer | |

(Continued)

FOREIGN PATENT DOCUMENTS

WO    WO-2008/157391 A1    12/2008

OTHER PUBLICATIONS

International Preliminary Report on Patentability received in corresponding International Application No. PCT/US2015/043817 dated Feb. 16, 2017, 5 pages.

(Continued)

*Primary Examiner* — Carlos R Ortiz Rodriguez
(74) *Attorney, Agent, or Firm* — Bradley D. Johnson

(57) ABSTRACT

One embodiment of the invention relates to a trainable transceiver. The trainable transceiver includes a transceiver circuit, a user input device, a battery, and a voltage regulator circuit. The transceiver circuit is configured to reproduce and transmit control signals for operating a plurality of remote electronic devices. The user input device is configured to accept user input. The voltage regulator circuit includes a DC-DC converter configured to step up the battery voltage level, a low leakage switch configured to couple the battery and the DC-DC converter, and a temperature-sensitive current source configured to control the low leakage switch. The battery is configured to power the transceiver circuit, the user input device, and the voltage regulator circuit.

20 Claims, 7 Drawing Sheets

(56) References Cited

U.S. PATENT DOCUMENTS

| | | | |
|---|---|---|---|
| 2006/0217850 A1* | 9/2006 | Geerlings | G08C 17/02 |
| | | | 701/2 |
| 2011/0309681 A1 | 12/2011 | Kamijima | |
| 2014/0272645 A1* | 9/2014 | McLean | H01M 8/0491 |
| | | | 429/428 |
| 2015/0002262 A1* | 1/2015 | Geerlings | G07C 9/00309 |
| | | | 340/5.25 |

OTHER PUBLICATIONS

International Search Report and Written Opinion of the International Searching Authority dated Nov. 19, 2015, in PCT/US2015/043817, 6 pages.

Chinese Search Report dated Sep. 9, 2018, received in corresponding Chinese application No. 2015800539876, 2 pages.

Office Action dated Oct. 8, 2018, in corresponding Chinese application No. 2015800539876, 7 pages.

Office Action dated Oct. 8, 2018, in corresponding Chinese application No. 2015800539876, English translation, 6 pages.

* cited by examiner

POWER SUPPLY FOR VEHICLE BASED TRAINABLE TRANSCEIVER

CROSS-REFERENCE TO RELATED PATENT APPLICATIONS

This application claims the benefit of and to U.S. Provisional Application No. 62/034,094, filed Aug. 6, 2014, which is hereby incorporated by reference in its entirety.

BACKGROUND

The present invention relates generally to the field of trainable transceivers for inclusion within a vehicle. A trainable transceiver generally sends and/or receives wireless signals using a transmitter, receiver, and/or transceiver. The wireless signals may be used to control other devices. Trainable transceivers, such as for communicating between vehicle systems and other systems/devices such as garage door openers, home security systems, and other electronics, require an energy source, such as a battery, able to perform in a variety of temperature and operating conditions. Additionally, the energy source should not interfere with the communication usage of the trainable transceiver. A user of a vehicle may not expect to be required to maintain or replace the energy source during the lifetime of the vehicle.

SUMMARY

One embodiment of the invention relates to a trainable transceiver. The trainable transceiver includes a transceiver circuit, a user input device, a battery, and a voltage regulator circuit. The transceiver circuit is configured to reproduce and transmit control signals for operating a plurality of remote electronic devices. The user input device is configured to accept user input. The voltage regulator circuit includes a DC-DC converter configured to step up the battery voltage level, a low leakage switch configured to couple the battery and the DC-DC converter, and a temperature-sensitive current source configured to control the low leakage switch. The battery is configured to power the transceiver circuit, the user input device, and the voltage regulator circuit. In some embodiments, the battery is a lithium-carbon monofluoride cell, lithium manganese dioxide cell, or lithium-thionyl chloride cell.

Another embodiment relates to a power assembly for a trainable transceiver. The power assembly includes a battery and a voltage regulator circuit. The voltage regulator circuit includes a DC-DC converter, a low-leakage switch configured to couple the battery and the DC-DC converter, and a temperature-sensitive current source configured to control the low-leakage switch. In some embodiments, the battery is a lithium-carbon monofluoride cell, lithium manganese dioxide cell, or lithium-thionyl chloride cell.

Another embodiment relates to a trainable transceiver. The trainable transceiver includes a transceiver circuit, a user input device, a battery, and a voltage regulator circuit. The transceiver circuit is configured to reproduce and transmit control signals for operating a plurality of remote electronic devices. The user input device is configured to accept user input. The voltage regulator circuit includes a DC-DC converter configured to step up the battery voltage level, a low leakage switch configured to couple the battery and the DC-DC converter, a temperature-sensitive current source configured to control the low-leakage switch, and at least one resistor coupled to the DC-DC converter. The at least one resistor is configured to filter spikes that may arise from the operation of the voltage regulator circuit. In some embodiments, the battery is a lithium-carbon monofluoride cell, lithium manganese dioxide cell, or lithium-thionyl chloride cell.

Another embodiment relates to a method for powering a trainable transceiver unit. The method includes coupling a battery and a voltage regulator circuit to the trainable transceiver unit. The voltage regulator circuit includes a DC-DC converter, a low leakage switch, and a temperature-sensitive current source. The method also includes coupling the battery and the DC-DC converter with the low leakage switch. The DC-DC converter is configured to step up the battery voltage level. The method also includes sensing a temperature with the temperature-sensitive current source and adjusting a base drive current provided by the battery to the low leakage switch with the temperature-sensitive current source. The adjustment made to the base drive current is based on the temperature.

In another embodiment, the temperature-sensitive current source includes a thermistor and a bipolar transistor, wherein the bipolar transistor is a current source. Optionally, at least one resistor is coupled to the bipolar transistor and configured to tune a voltage at the base of the bipolar transistor to obtain a desired temperature versus current characteristic.

In yet another embodiment, the temperature-sensitive current source includes a high DC current gain bipolar transistor, configured so that the current source is coupled to the base of the bipolar transistor, the battery is coupled to the emitter of the bipolar transistor, and the DC-DC converter is coupled to the collector of the bipolar transistor.

In yet another embodiment, the DC-DC converter is a boost converter, and optionally, at least one boost capacitor and at least one slowing capacitor, wherein the at least one boost capacitor is configured to provide a low impedance power input to the boost convert and to reduce unwanted RF emissions, and wherein the at least one slowing capacitor is configured to slow the turn on of the bipolar transistor to reduce inrush current into the at least one boost capacitor.

In yet another embodiment, at least one resistor is coupled to the DC-DC converter and is configured to filter for spikes that may arise from the operation of the voltage regulator circuit. In yet another embodiment, when the temperature of the battery drops below a threshold, the temperature-sensitive current source is configured to turn on the low leakage switch; the low leakage switch is configured to allow the DC-DC converter to draw current, and the DC-DC converter is configured to maintain a steady voltage level.

In some embodiments, the battery is a lithium-carbon monofluoride cell, lithium manganese dioxide cell, or lithium-thionyl chloride cell.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
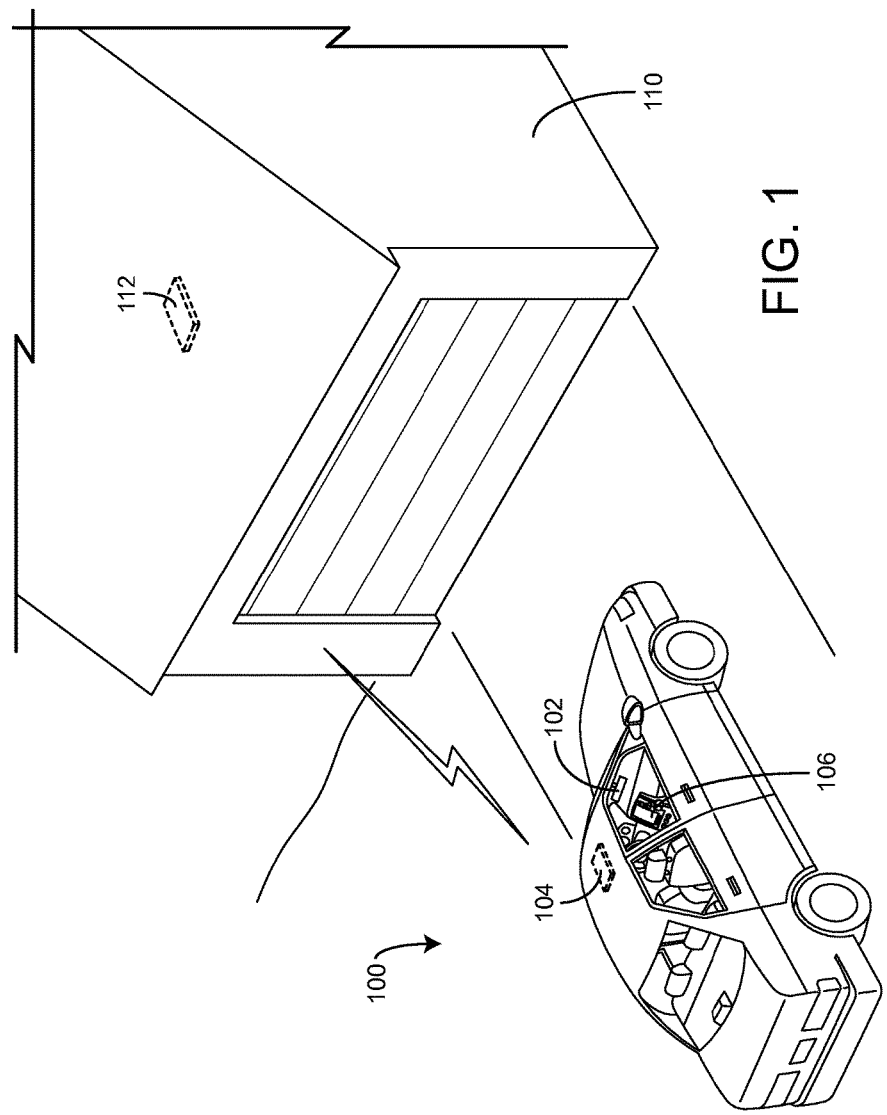
FIG. 1 illustrates a perspective view of a vehicle and a garage according to an exemplary embodiment.

Referring generally to the FIGURES, a trainable transceiver unit for mounting in a vehicle is shown, according to several exemplary embodiments. The trainable transceiver unit may be configured to "learn" the characteristics of multiple remote control signals generated by multiple remote control devices (e.g., a remote control for a garage door, a security gate, a home lighting system, a home security system, etc.) and store an indication of the multiple remote control signals in a local memory thereof for subsequent retransmission. The trainable transceiver unit may reproduce a stored control signal upon receiving a user input (e.g., via a push button, a voice command, etc.) and transmit the stored control signal for operating a remote electronic system or device.

The trainable transceiver unit may be integrated within a vehicle system component such as a rear view mirror, an instrument panel, a headliner, or other locations within the vehicle. Advantageously, the trainable transceiver unit may be installed quickly and easily into an existing vehicle (e.g., as part of a vehicle upgrade or retrofit) without requiring extensive integration with the existing vehicle system. For example, the trainable transceiver unit may be a standalone device capable of independent and self-sufficient operation without relying on input from a vehicle subsystem or energy from the main vehicle battery. The trainable transceiver unit may include all the necessary processing electronics for learning, storing, and retransmitting a control signal. The trainable transceiver unit may further include a battery (e.g., separate from the main vehicle battery) used to power only the trainable transceiver unit.

In some embodiments, the trainable transceiver unit is integrated with a rear view mirror assembly for the vehicle. For example, the trainable transceiver unit may include a battery and a transceiver circuit mounted between a front reflective surface (e.g., the mirror) and a back housing of the rear view mirror assembly. The trainable transceiver unit may include one or more user input devices for controlling collection and retransmission of a remote control signal.

Advantageously, the trainable transceiver unit may include a voltage regulator circuit with a DC-DC converter, a low leakage switch, and a temperature-sensitive current source. The DC-DC converter may be used to regulate the voltage supplied by the battery, thereby providing a stabilized voltage to the trainable transceiver, extending battery life, extending operation temperature range, and reducing the need for battery replacement. The battery may be a long-life battery (e.g., lithium battery, lithium-thionyl chloride cell, lithium-carbon monofluoride cell, lithium manganese dioxide cell, etc.) configured to operate within a range of typical automotive temperatures. Advantageously, the long-life battery has very low self-discharge, such as at high temperatures and/or typical automobile temperatures. The temperature-sensitive current source may be used to adjust the drive to the low leakage switch.

Referring now to FIG. 1, a perspective view of a vehicle 100 and garage 110 is shown, according to an exemplary embodiment. Vehicle 100 may be an automobile, truck, sport utility vehicle (SUV), mini-van, or other vehicle. Vehicle 100 is shown to include a trainable transceiver unit 102. In some embodiments, trainable transceiver unit 102 may be integrated with a mirror assembly (e.g., a rear view mirror assembly) of vehicle 100. In other embodiments, trainable transceiver unit 102 may be mounted to other vehicle interior elements, such as a vehicle headliner 104, a center stack 106, a visor, an instrument panel, or other control unit within vehicle 100.

Advantageously, trainable transceiver unit 102 may be configured for quick and easy installation into vehicle 100. For example, for embodiments in which trainable transceiver unit 102 is integrated with a rear view mirror assembly, installation may require only swapping an existing rear view mirror assembly for the integrated rear view mirror display and trainable transceiver unit assembly. Trainable transceiver unit 102 may include all the electronic components for self-sufficient operation (e.g., a control circuit, a transceiver circuit, a battery, etc.) without requiring a wired power or data connection to another vehicle system component.

Trainable transceiver unit 102 is configured to communicate with a remote electronic system 112 of a garage 110 or other structure. In some embodiments, remote electronic system 112 is configured to control operation of a garage door attached to garage 110. In other embodiments, remote electronic system 112 may be a home lighting system, a home security system, a data network (e.g., LAN, WAN, cellular, etc.), a HVAC system, or any other remote electronic system capable of receiving control signals from trainable transceiver unit 102.

Figure 2:
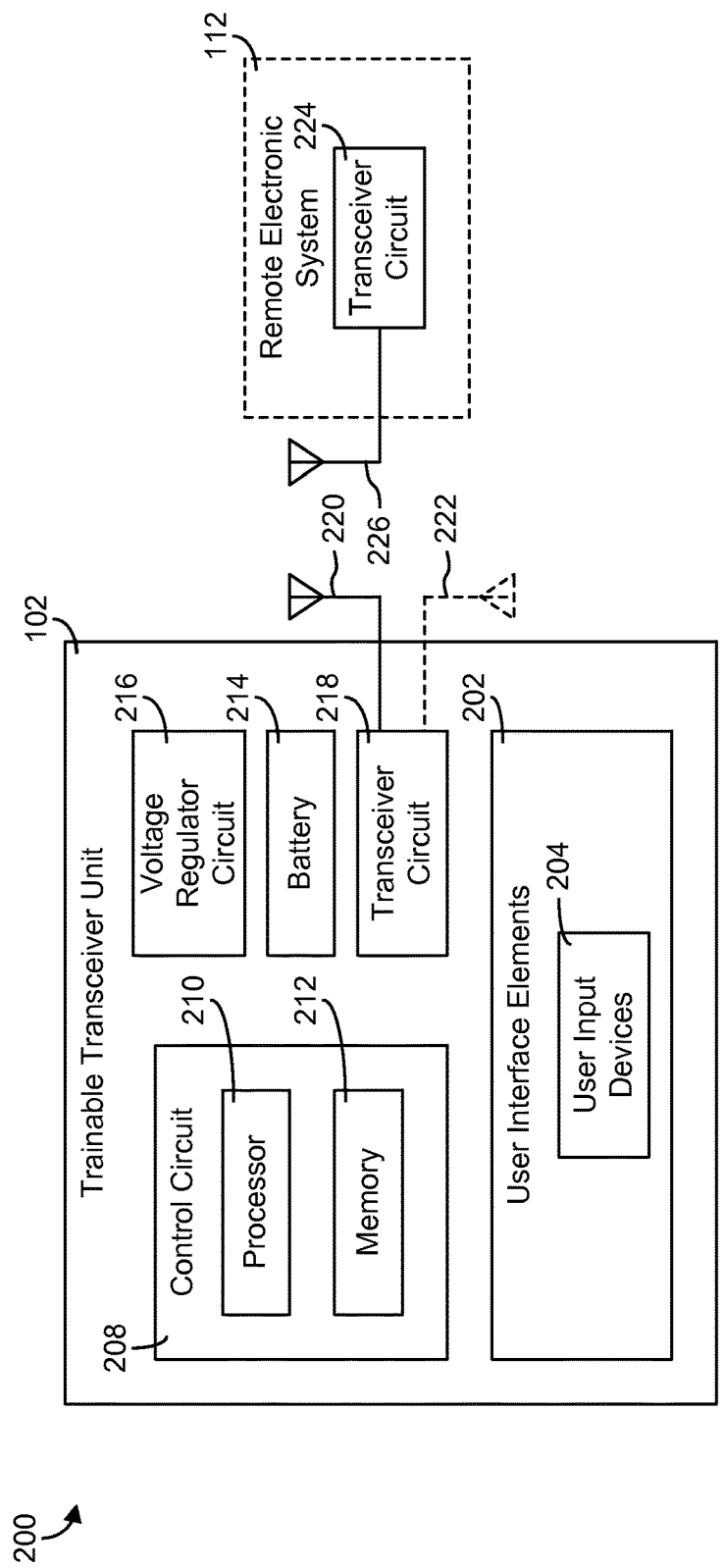
FIG. 2 illustrates a block diagram of a system including a transceiver unit and a remote electronic unit according to an exemplary embodiment.

Referring now to FIG. 2, a block diagram of a system 200 including a trainable transceiver unit 102 and a remote electronic system 112 is shown, according to an exemplary embodiment. In brief overview, trainable transceiver unit 102 is shown to include user interface elements 202, a control circuit 208, a battery 214, a voltage regulator circuit 216, and a transceiver circuit 218.

User interface elements 202 may facilitate communication between a user (e.g., driver, passenger, or other occupant of vehicle 100) and trainable transceiver unit 102. For example, user interface elements 202 may be used to receive input from a user. User interface elements 202 are shown to include user input devices 204.

In some embodiments, user input devices 204 include one or more push buttons, switches, dials, knobs, touch-sensitive user input devices (e.g., piezoelectric sensors, capacitive touch sensors, optical sensors, etc.), or other devices for translating a tactile input into an electronic data signal. Advantageously, user input devices 204 may be integrated with a rear view mirror assembly of vehicle 100. For example, user input devices 204 may include one or more pushbuttons (e.g., mounted along a bottom surface of a rear view mirror assembly), as shown and described in greater detail with reference to FIGS. 3-X. User input devices 204 provide input signals to control circuit 208 for controlling operation of trainable transceiver unit 102.

Still referring to FIG. 2, trainable transceiver unit 102 is shown to include a control circuit 208. Control circuit 208 may be configured to receive input from user input devices 204. Control circuit 208 may further be configured to operate transceiver circuit 218 for conducting electronic data communications with remote electronic system 112.

Control circuit 208 is shown to include a processor 210 and memory 212. Processor 210 may be implemented as a general purpose processor, a microprocessor, a microcontroller, an application specific integrated circuit (ASIC), one or more field programmable gate arrays (FPGAs), a CPU, a GPU, a group of processing components, or other suitable electronic processing components.

Memory 212 may include one or more devices (e.g., RAM, ROM, Flash® memory, hard disk storage, etc.) for storing data and/or computer code for completing and/or facilitating the various processes, layers, and modules described in the present disclosure. Memory 212 may comprise volatile memory or non-volatile memory. Memory 212 may include database components, object code components, script components, or any other type of information structure for supporting the various activities and information structures described in the present disclosure. In some implementations, memory 212 is communicably connected to processor 210 via control circuit 208 and includes computer code (e.g., data modules stored in memory 212) for executing one or more control processes described herein.

Still referring to FIG. 2, trainable transceiver unit 102 is shown to include a battery 214. Battery 214 may be configured to supply power to the various electronic components of trainable transceiver unit 102. Battery 214 is separate from the main vehicle battery used to power other systems and subsystems of vehicle 100 (e.g., a stereo system, a navigation system, a lighting system, etc.). In some embodiments, battery 214 is used to power only trainable transceiver unit 102. Trainable transceiver unit 102 may receive power from only battery 214 without relying on other supplemental or alternative power sources. Advantageously, battery 214 may facilitate operation of trainable transceiver unit 102 independent from the main vehicle battery and vehicle power line, thereby insulating trainable transceiver unit 102 from undesirable vehicle power line noise.

In some embodiments, battery 214 may be installed within a rear view mirror assembly of vehicle 100 (e.g., between the mirror and back housing). For implementations in which trainable transceiver unit 102 is integrated with a rear view mirror display, the integrated product may be sold and installed as a standalone unit. Advantageously, locating battery 214 within the rear view mirror assembly allows trainable transceiver unit 102 to operate independently without requiring wiring connections to any other component of vehicle 100. This advantage facilitates installation of trainable transceiver unit 102 by eliminating the need to disassemble vehicle 100 to run power cables from a main vehicle power line to trainable transceiver unit 102. Any necessary power cables or other wiring connections may be contained entirely within the rear view mirror assembly. Battery 214 may be configured to be quickly and easily replaced without requiring substantial disassembly or rewiring.

Battery 214 may be a long-life battery configured to reliably provide power over an extended period of time (e.g., 1 year, 2 years, 5 years, 10 years, etc.). In some embodiments, battery 214 is a lithium cell battery or other battery having a high power density. For example, battery 214 may include a lithium-thionyl chloride energy cell. The lithium-thionyl chloride energy cell may contain a liquid mixture of thionyl chloride (i.e., SOCl2) and lithium tetrachloroaluminate (i.e., LiAlCl4). The thionyl chloride may act as a cathode for the energy cell and the lithium tetrachloroaluminate may act as an electrolyte for the energy cell. Lithium-thionyl chloride batteries may be well suited for extremely low-current applications where long battery life is necessary or desirable. In some embodiments, battery 214 includes a porous carbon material. The porous carbon material may function as a cathode current collector (e.g., for receiving electrons from an external circuit).

Battery 214 may be configured to have a low self-discharge rate. Advantageously, a high energy or power density in combination with a low self-discharge rate may contribute to battery 214 reliably providing power for an extended period of time. The high energy or power density in combination with the low self-discharge rate may also qualify battery 214 as a long-life battery.

Battery 214 may store energy chemically and/or electrically. For example, in some embodiments, battery 214 includes a capacitive element configured to store electrical energy. In some embodiments, battery 214 includes a "hybrid layer capacitor" used with a lithium cell. The hybrid layer capacitor may be the same as or similar to the hybrid layer capacitors sold by Tadiran Batteries. For example, a hybrid layer capacitor may be a type of rechargeable battery. A hybrid layer capacitor may include electrodes comprising lithium intercalation compounds. A hybrid layer capacitor generally has a low impedance and can deliver high current pulses. One or more hybrid layer capacitors may be connected in parallel with the lithium cell.

In some embodiments, the performance and reliability properties (e.g., output voltage, output current, energy capacity, power density, self-discharge rage, etc.) of the hybrid layer capacitor may be configured to match the performance and reliability properties of the lithium cell. For example, the hybrid layer capacitor may be charged to a voltage of approximately 3.6 V. In some embodiments, the hybrid layer capacitor may be charged to a voltage of approximately 3.9 V or any other voltage associated with the lithium cell (e.g., a voltage produced by the lithium cell, a voltage produced by a series combination of lithium cells, etc.). Advantageously, the use of one or more hybrid layer capacitors (e.g., with or without a lithium cell) may contribute to the high energy density and/or high power density of battery 214 and may facilitate standalone use of battery 214 for an extended period of time (e.g., five years, ten years, up to twenty-five years, etc.).

Battery 214 may be configured to reliably and safely provide power over an extended range of temperatures at which vehicle 100 operates. For example, battery 214 may be subjected to relatively high temperatures (e.g., above 100° F., above 150° F., etc.) if vehicle 100 is parked in a sunny location on a hot summer day. Temperatures within vehicle 100 may range from extremely low temperatures (e.g., at or below −20° F. during winter months) to extremely high temperatures (e.g., at or above 100° F. during summer months). Battery 214 may be configured to retain and provide the energy required to power trainable transceiver unit 102 for an extended period of time throughout an extended temperature range. In some embodiments, battery 214 includes a glass-metal seal for facilitating the extended use of battery 214 in an automotive implementation.

Still referring to FIG. 2, trainable transceiver unit 102 is shown to include a voltage regulator circuit 216. In some embodiments, voltage regulator circuit 216 may be used to extend the lifetime of battery 214. Voltage regulator circuit 216 helps compensate for poor battery performance when the load is high and/or when the temperature is low. Voltage regulator circuit 216 also helps compensate for poor battery performance in response to variations in load and/or temperature, such as variations in load and/or temperature due to operation of trainable transceiver unit 102 in an automobile context. Voltage regulator circuit 216 may include a DC-DC converter 508 for stabilizing the voltage provided by the battery when the temperature is relatively low, or when a transceiver circuit 218 is being utilized. The DC-DC converter 508 may be a single cell integrated boost converter. Voltage regulator circuit 216 may include a low leakage switch 506 to couple the battery 214 with the DC-DC converter 508. When the DC-DC converter 508 is not needed, the low leakage switch 506 is open, thereby reducing the typical high current leakage current of the DC-DC converter 508. The low leakage switch 506 may be a high DC current gain bipolar transistor with an off state collector current as small as a few nano-Amperes. A temperature-sensitive current source 504 may be used to regulate the base drive current to the low leakage switch. The temperature-sensitive nature of the current source 504 may be implemented by use of a thermistor whose impedance is a function of temperature; by placing the thermistor near the battery, the thermistor and battery may share the same thermal environment and thus be thermally coupled. The thermistor may be chosen to have a negative temperature coefficient, so that the impedance of the thermistor is low when the temperature is high, and the impedance is high when the temperature of low.

Still referring to FIG. 2, trainable transceiver unit 102 is shown to include a transceiver circuit 218 and an antenna 220. Transceiver circuit 218 may include transmit and/or receive circuitry configured to communicate via antenna 220 with remote electronic system 112. Transceiver circuit 218 may be configured to transmit wireless control signals having control data for controlling remote electronic system 112. Transceiver circuit 208 may be further configured to receive wireless status signals including status information from remote electronic system 112. Trainable transceiver unit 102 and remote electronic system 112 may communicate using any suitable wireless standard (e.g., Bluetooth, Bluetooth Low Energy, Z-Wave, Zibgee, WiFi, WiMax, etc.) or other communications protocols compatible with or proprietary to remote electronic system 112. Trainable transceiver unit 102 may be configured to learn and replicate control signals using any wireless communications protocol.

In a training mode of operation, transceiver circuit 218 may be configured to receive one or more characteristics of an activation signal sent from an original transmitter for use with remote electronic system 112. An original transmitter may be a remote or hand-held transmitter, which may be sold with remote electronic system 112 or as an after-market item. The original transmitter may be configured to transmit an activation signal at a predetermined carrier frequency and having control data configured to actuate remote electronic system 112. For example, the original transmitter may be a hand-held garage door opener transmitter configured to transmit a garage door opener signal at a frequency (e.g., centered around 315 MHz or 355 MHz, etc.). The activation signal may include control data, which can be a fixed code, a rolling code, or another cryptographically-encoded code. Remote electronic system 112 may be configured to open a garage door, for example, in response to receiving the activation signal from the original transmitter.

Transceiver circuit 218 may be configured to identify and store one or more characteristics of the activation signal (e.g., signal frequency, control data, modulation scheme, etc.) from the original transmitter or from another source. In some embodiments, transceiver circuit 218 is configured to learn at least one characteristic of the activation signal by receiving the activation signal, determining the frequency of the activation signal, and/or demodulating the control data from the activation signal. Alternatively, trainable transceiver unit 102 can receive one or more characteristics of the activation signal by other methods of learning. For example, the one or more characteristics of the activation signal can be preprogrammed into memory 212 during manufacture of trainable transceiver unit 102, input via user input devices 204, or learned via a "guess and test" method. In this manner, trainable transceiver unit 102 need not actually receive the activation signal from an original transmitter in order to identify characteristics of the activation signal. Trainable transceiver unit 102 may store the characteristics of the activation signal in memory 212.

In some embodiments, transceiver circuit 218 is configured to integrate the original transmitter as part of the wireless control system. For example, operation of the original transmitter within range of trainable transceiver unit 102 may provide an activation signal to transceiver circuit 218, indicating that the signal was also sent to remote electronic system 112. In some embodiments, transceiver circuit 218 eliminates the need for continued use of the original transmitter after training is complete.

Transceiver circuit 218 may be configured to generate a carrier frequency at any of a number of frequencies (e.g., in response to a control signal from control circuit 208). In some embodiments, the frequencies generated can be in the ultra-high frequency range (e.g., between 20 and 470 megahertz (MHz), between about 20 and 950 MHz, between about 280 and 434 MHz, up to 868 MHz, up to 920 MHz, up to 960 MHz, etc.) or in other frequency ranges. The control data modulated with the carrier frequency signal may be frequency shift key (FSK) modulated, amplitude shift key (ASK) modulated, or modulated using another modulation technique. Transceiver circuit 218 may be configured to generate a wireless control signal having a fixed code, a rolling code, or other cryptographically encoded control code suitable for use with remote electronic system 112.

Transceiver circuit 218 may use antenna 220 to increase a range or signal quality of the communications between trainable transceiver unit 102 and remote electronic system 112. In some embodiments, antenna 220 is a monopole antenna including a single antenna branch. In other embodiments, a second antenna branch 222 may be used. Antenna branch 222 and antenna 220 may be arranged in a dipole configuration (e.g., extending in opposite directions from an antenna stem, as a dipole loop, etc.). Advantageously, the dipole configuration may improve system performance by preventing resonance at an undesirable frequency. The dipole antenna configuration is discussed in greater detail with reference to FIG. 15.

Still referring to FIG. 2, system 200 is shown to include a remote electronic system 112. Remote electronic system 112 may be any of a plurality of remote electronic systems, such as a garage door opener (as shown in FIG. 1), security gate control system, security lights, remote lighting fixtures or appliances, a home security system, or another set of remote devices. Remote electronic system 112 is shown to include a transceiver circuit 224 and an antenna 226. Transceiver circuit 224 includes transmit and/or receive circuitry configured to communicate via antenna 226 with trainable transceiver unit 102. Transceiver circuit 224 may be configured to receive wireless control signals from trainable transceiver unit 102. The wireless control signals may include control data for controlling operation of remote electronic system 112.

Figure 3:
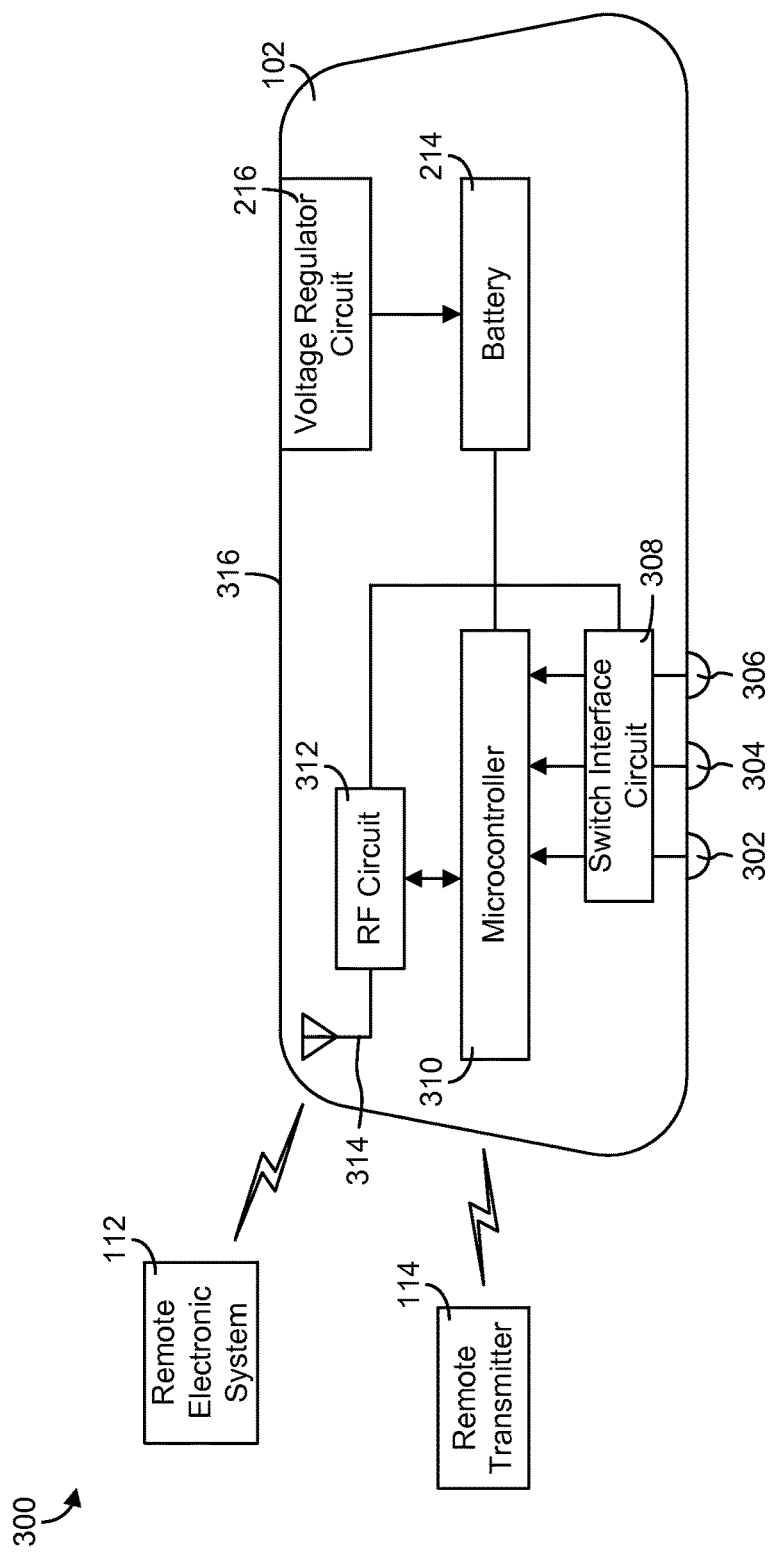
FIG. 3 illustrates an electrical schematic diagram of the trainable transceiver unit of FIG. 2 according to an exemplary embodiment.

Referring now to FIG. 3, an electrical schematic diagram 300 of trainable transceiver unit 102 is shown, according to an exemplary embodiment. Schematic diagram 300 illustrates the data and power connections within trainable transceiver unit 102 as well the electronic data communications between trainable transceiver unit 102, remote electronic system 112, and remote transmitter 114.

Schematic diagram 300 is shown to include several of the components of trainable transceiver unit 102 previously described with reference to FIG. 2. For example, schematic diagram 300 is shown to include display 206, battery 214, and voltage regulator circuit 216. Schematic diagram 300 is shown to further include several additional components including buttons 302, 304, and 306, a switch interface circuit 308, a microcontroller 310, and a RF circuit 312 with an attached antenna 314.

Notably, schematic diagram 300 illustrates the various components of trainable transceiver unit 102 within a housing 316. Housing 316 may be a perimeter frame, rear housing, or other boundary associated with a rear view mirror assembly. Advantageously, all components of trainable transceiver unit 102 may be located within or mounted upon housing 316.

Still referring to FIG. 3, schematic diagram 300 is shown to include buttons 302, 304, and 306. Buttons 302-306 may be an embodiment of user input devices 204, as previously described with reference to FIG. 2. For example, buttons 302-306 may be user operable input devices for controlling operation of trainable transceiver unit 102. Each of buttons 302-306 may be associated with (e.g., trained, programmed, configured to operate, etc.) a different remote device controllable by trainable transceiver unit 102. For example, button 302 may be associated with a garage door system, button 304 may be associated with an access gate system, and button 306 may be associated with a home lighting system. Buttons 302-306 may include any number of buttons and may be configured to operate any number of remote electronic systems 112.

In some embodiments, each remote electronic system 112 controlled by trainable transceiver unit 102 requires a control signal having different signal characteristics (e.g., operating frequency, modulation scheme, security code, etc.). Each of buttons 302-306 may cause trainable transceiver unit 102 to emit a control signal having different signal characteristics (e.g., for controlling multiple remote electronic systems with a single trainable transceiver unit). In some embodiments, buttons 302-306 may be pushbutton switches which complete an electrical path within switch interface circuit 308 when pushed.

Switch interface circuit 308 may be a circuit element configured to translate a user input received via buttons 302-306 into an electrical signal for transmission to microcontroller 310. Switch interface circuit 308 may receive an electric current and/or voltage from battery 214 and selectively deliver the received current and/or voltage to a particular port of microcontroller 310. In some embodiments, switch interface circuit delivers the electric current and/or voltage to a microcontroller port in response to a user selection of buttons 302-306. The particular port of microcontroller 310 to which switch interface circuit 308 routes current and/or voltage may depend on which of buttons 302-306 is pressed. Thus, microcontroller 310 may receive a different input from switch interface circuit 308 (e.g., an input received at a different microcontroller port) based on which of buttons 302-306 is pressed. In some embodiments, switch interface circuit 308 includes a capacitive element configured to prevent battery 214 from discharging in the event that one of buttons 302-306 is maintained in a pressed condition (e.g., held by a user, stuck in a pressed position, etc.).

Still referring to FIG. 3, schematic diagram 300 is shown to include a microcontroller 310 and a RF circuit 312. Microcontroller 310 and RF circuit 312 may be embodiments of control circuit 208 and transceiver circuit 218 as previously described with reference to FIG. 2. Microcontroller 310 may be configured to receive an input from switch interface circuit 308 and to operate display 206 and/or RF circuit 312 in response to the input. For example, microcontroller 310 may be configured to monitor or measure an amount of energy remaining in battery 214 (e.g., via a measured voltage, current, etc.) and cause display 206 to present an indication of the amount of energy remaining.

RF circuit 312 may be configured to receive a control signal from remote transmitter 114 (e.g., during a training mode of operation), to identify one or more characteristics of the control signal (e.g., frequency, control data, modulation scheme, etc.), and to store the control signal characteristics in a local memory of trainable transceiver unit 102. RF circuit 312 may receive and store any number of control signal characteristics corresponding to any number of remote transmitters 114.

RF circuit 312 may be configured to reproduce the control signal in response to an input received from microcontroller 310. For example, in response to a first input received from microcontroller 310 (e.g., caused by a user pressing button 302), RF circuit 312 may reproduce and transmit a first control signal via antenna 314. In response to a second input received from microcontroller 310 (e.g., caused by a user pressing button 304), RF circuit 312 may reproduce and transmit a second control signal via antenna 314. In response to a third input received from microcontroller 310 (e.g., caused by a user pressing button 306), RF circuit 312 may reproduce and transmit a third control signal via antenna 314. Advantageously, RF circuit 312 may be capable of reproducing any number of control signals for operating any number of remote electronic systems 112.

Figure 4:
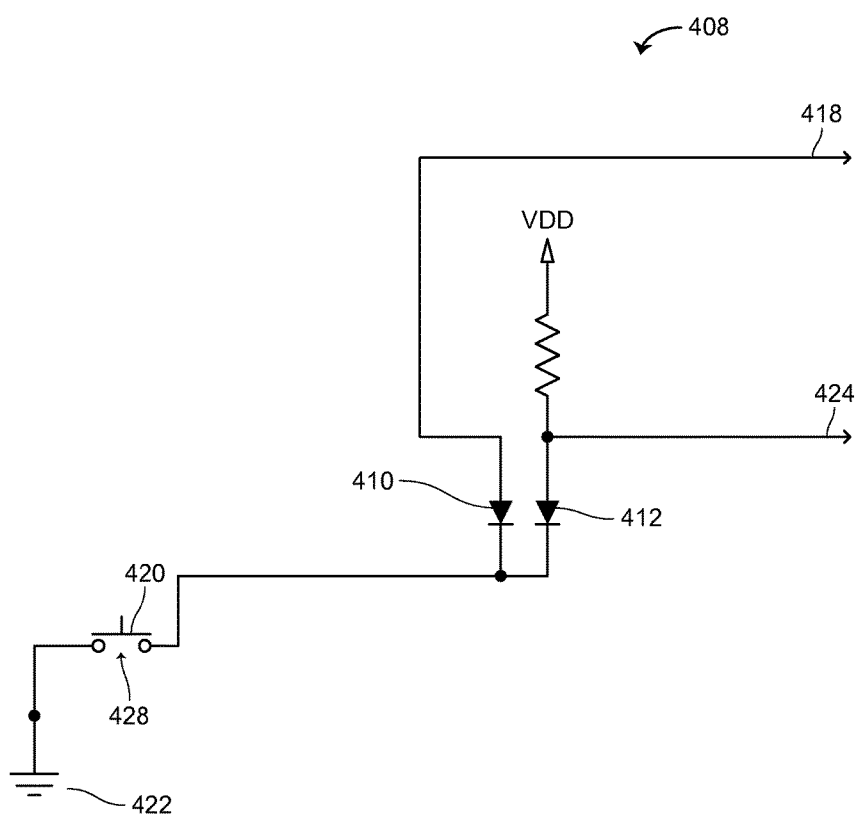
FIG. 4 illustrates a schematic diagram of a switch interface circuit according to an exemplary embodiment.

Referring now to FIG. 4, a detailed drawing of switch interface circuit 408 is shown, according to an exemplary embodiment. Switch interface circuit 408 may draw power (e.g., from low leakage switch 506) via power line 418 through diode 410, and be connected to microcontroller port 424 through diode 412. Switch interface circuit 408 is shown to include a switch 420. Switch 420 may be mechanically coupled to one of buttons 302, 304, or 306 and may be movable between an open position and a closed position. When a user presses one of buttons 302, 304, or 306, switch 420 may be moved into the closed position, thereby bridging gap 428 and allowing current to flow from the power line 418 through the diode 410, and allowing current to flow from VDD through the diode 412. This energizes microcontroller port 424. For embodiments in which power line 418 is supplied by low leakage switch 506, the current may be a direct current (e.g., a DC current). When switch 420 is in the closed position, electric current may also flow to ground 422.

Figure 5:
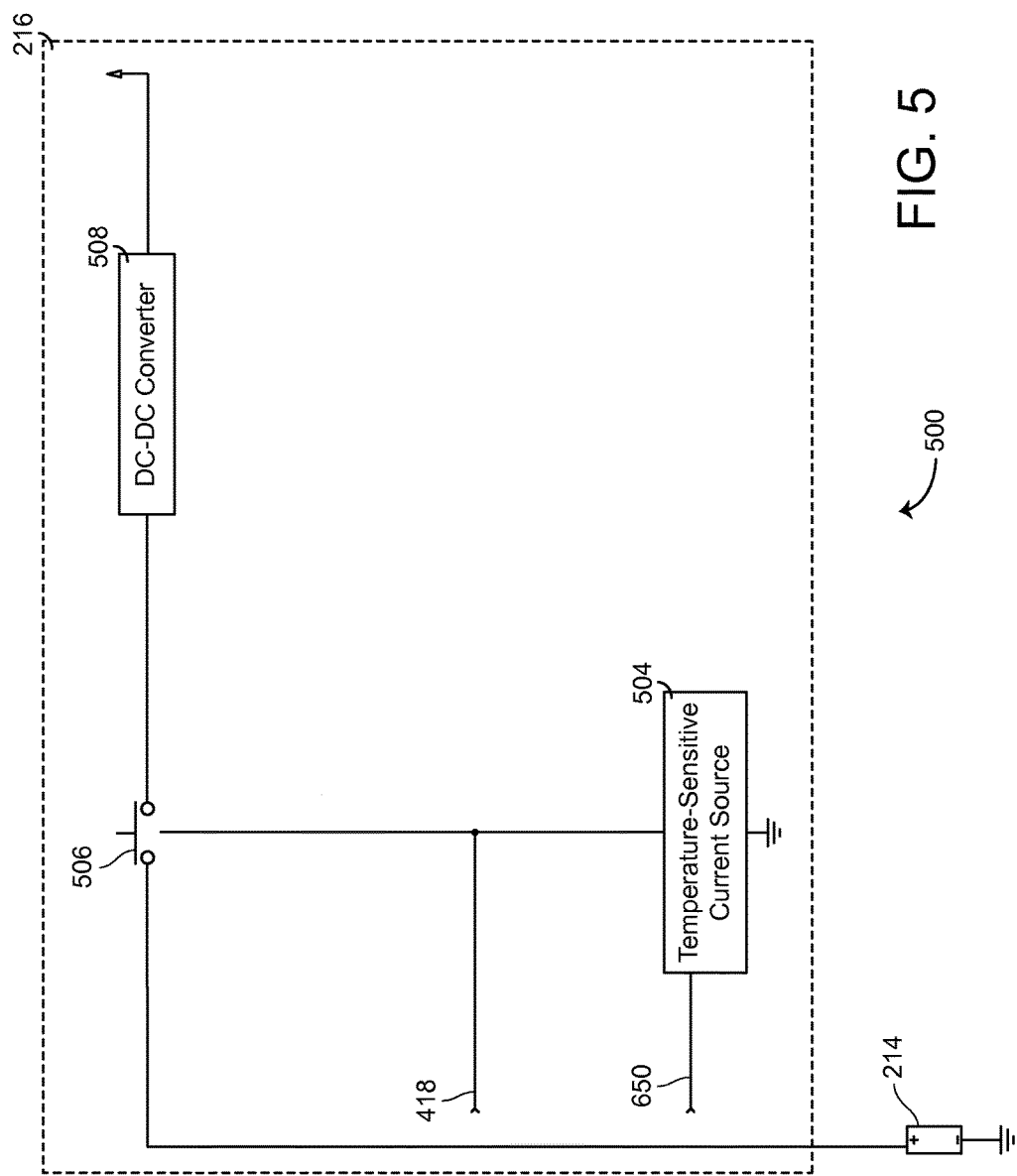
FIG. 5 illustrates an electrical schematic diagram of a voltage regulator circuit and battery according to an exemplary embodiment.

Referring now to FIG. 5, an electrical schematic diagram 500 of voltage regulator circuit 216 and battery 214 is shown, according to an exemplary embodiment. Battery 214 may be connected to a DC-DC converter 508 through a low leakage switch 506. Low leakage switch 506 may be a high DC (hFE) current gain bipolar transistor. When low-leakage switch 506 is implemented using a bipolar transistor, system efficiency is improved by varying the transistor's base drive current with temperature. As temperature decreases, the battery voltage will tend to decrease, and DC-DC converter 508 will require more current to provide the required output power. The current gain of switch 506 implemented as a bipolar transistor will also decrease at low temperatures, increasing drive current requirements. If the base drive current were fixed at the value required for low temperature operation, the base current could be an order of magnitude higher than is needed at room temperature, wasting significant battery current. The low leakage switch 506 may be controlled either by a temperature-sensitive current source 504 connected to microcontroller port 650, or by switch interface circuit 408 through power line 418. Alternatively, when a user presses one of buttons 302, 304, or 306, power line 418 also closes low leakage switch 506, so that DC-DC converter 508 may provide additional power when transceiver circuit 218 is being utilized.

Figure 6:
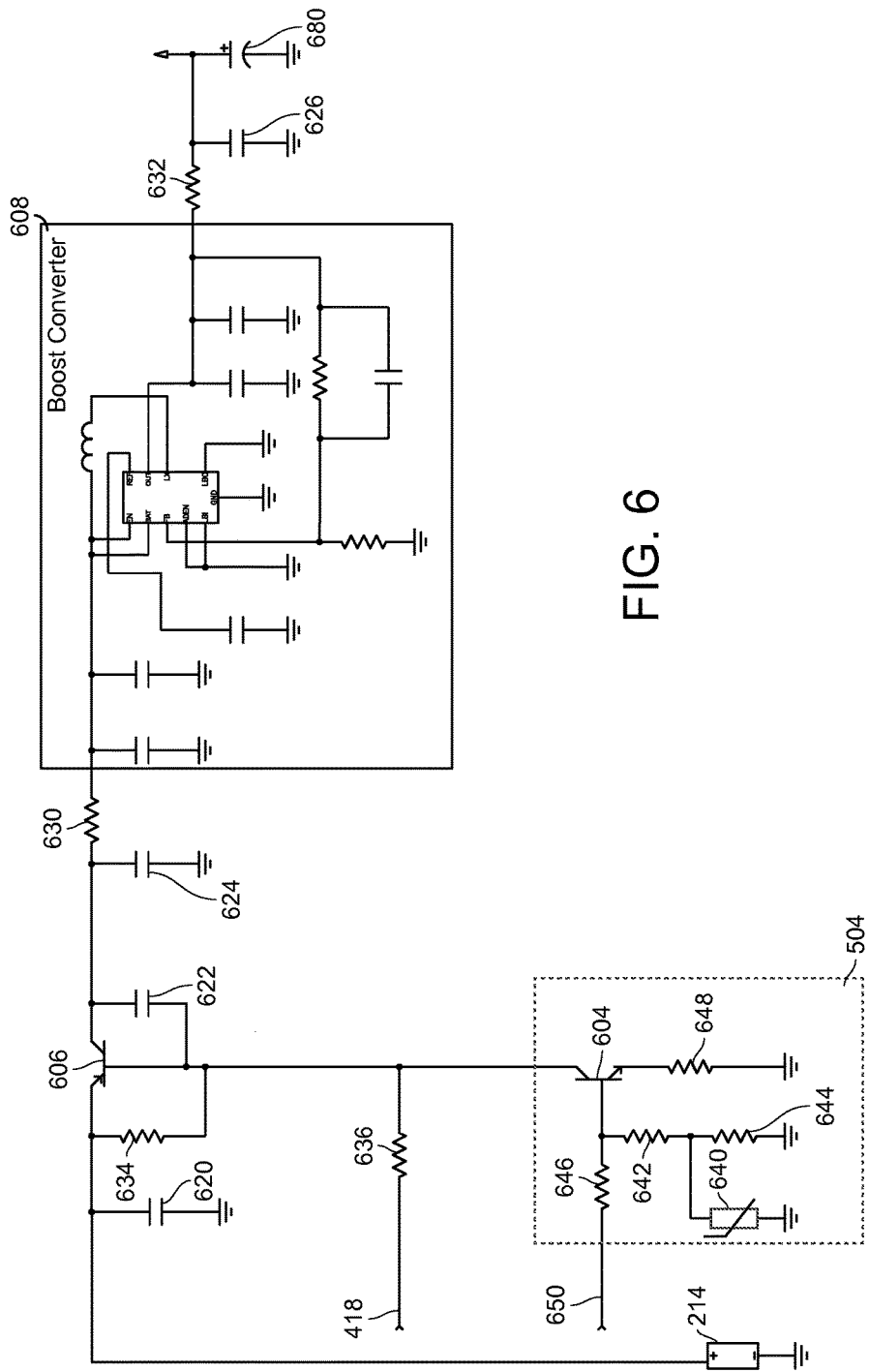
FIG. 6 illustrates a detailed view of the voltage regulator circuit and battery of FIG. 5 according to an exemplary embodiment.

Referring now to FIG. 6, a detailed drawing of battery 214 and voltage regulator circuit 216 is shown, according to an exemplary embodiment. In one embodiment, DC-DC converter 508 may be a single cell integrated boost converter 608. Boost converter 608 may be shielded. Capacitors 626 and 680 may be used to store charge to regulate voltage when the boost converter 608 is operating. Capacitors 620 and 624 are used to provide a low impedance power input to boost converter 608 and to reduce unwanted RF emissions. Resistors 630 and 632 may be used to filter spikes that may arise from the operation of voltage regulator circuit 216. Resistors 630 and 632 may optionally be replaced with ferrite beads or inductors for better RF noise suppression. Capacitor 622 is used to slow the turn on of bipolar transistor 606 to reduce inrush current into capacitor 624 and the input of converter 608. Low leakage switch 506 may be a high DC (hFE) current gain bipolar transistor 606. In one embodiment, bipolar transistor 606 may be a pnp type transistor. Resistor 634 may be used to establish a near zero base-emitter voltage when bipolar transistor 606 is in the off state. Temperature-sensitive current source 504 may comprise a bipolar transistor 604. In one embodiment, bipolar transistor 604 may be a npn type transistor. Bipolar transistor 604 may receive its base voltage from microcontroller port 650. Temperature-sensitive current source 504 may also comprise a thermistor 640. Thermistor 640 may have a negative temperature coefficient. As the temperature rises, the impedance of thermistor 640 drops. In one embodiment, thermistor 640 may be chosen such that the impedance of thermistor 640 may be on the order of approximately 50 ohms when the temperature is high. As the temperature drops, the impedance of thermistor 640 increases. In one embodiment, thermistor 640 may be chosen such that the impedance of thermistor 640 may be on the order of approximately 100K ohms when the temperature is low. Thermistor 640 may be placed near battery 214 so as to share the same thermal environment as battery 214. Resistors 642, 644, and 646 may be used to help tune the voltage at the base of bipolar transistor 604 to obtain the desired temperature vs. current characteristic. In some embodiments, boost converter 608 allows for improved voltage regulation of battery 214 across both load variation and temperature variation.

Still referring to FIG. 6, battery 214 may be coupled to the emitter of bipolar transistor 606, the collector of bipolar transistor 604 may be coupled to the base of bipolar transistor 606, and boost converter 608 may be connected to the collector of bipolar transistor 606. Microcontroller port 650 may be coupled to the base of bipolar transistor 604, and ground may be coupled to the emitter of bipolar transistor 604 through resistor 648. Thus, the base current of bipolar transistor 606 depends in part on the collector current of bipolar transistor 604. When battery 214 is not providing power for transceiver unit 102, the collector current of bipolar transistor 604 may be very small, on the order of nano-Amperes. When battery 214 is providing power for transceiver unit 102, the collector current of bipolar transistor 604 may be relatively large, on the order of 100-800 milli-Amperes. When the voltage supplied by battery 214 drops due to a decrease in temperature, the impedance of thermistor 640 increases, and the voltage at the base of bipolar transistor 604 rises, increasing the collector current of bipolar transistor 604. This increases the base current of bipolar transistor 606, which closes low leakage switch 506 and increases the current available to boost converter 608 through collector current of bipolar transistor 606. Alternatively, when a user presses one of buttons 302, 304, and 306, power line 418 is coupled to ground through the closed switch 420 and diode 410. This increases the draw of base current from bipolar transistor 606 through resistor 636, likewise increasing collector current of bipolar transistor 606 to boost converter 608, to provide additional power when transceiver circuit 218 is active. When bipolar transistor 604 is off or when switch 420 is open, base current of bipolar transistor 604 is zero, and so bipolar transistor 606 is off (bipolar transistor 606 is an embodiment of low leakage switch 506, which is open).

Figure 7:
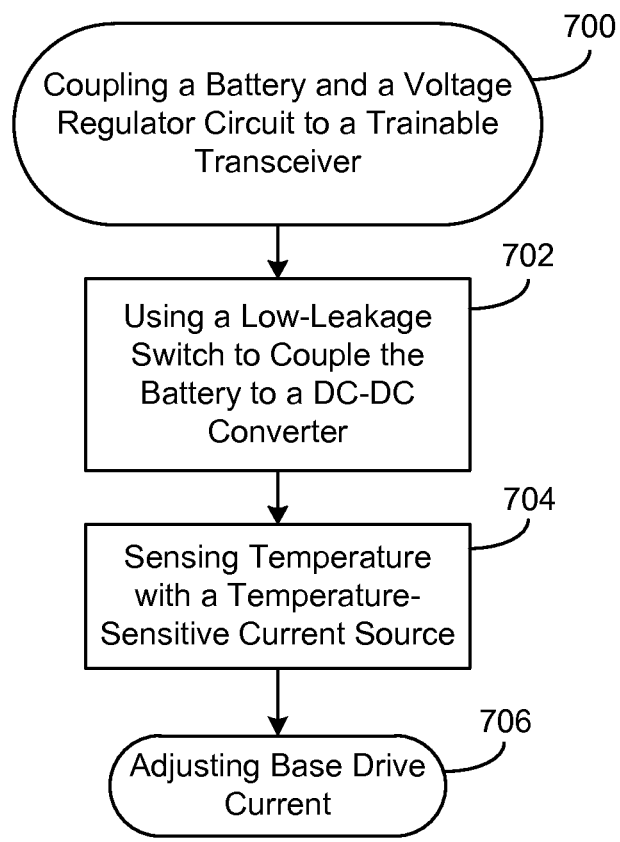
FIG. 7 illustrates a flow chart of a method of powering a trainable transceiver through a voltage regulator circuit according to an exemplary embodiment.

Referring now to FIG. 7, a flow chart of a method of powering a trainable transceiver through the voltage regulator circuit is shown, according to an exemplary embodiment. In one embodiment a battery and a voltage regulator circuit are coupled to trainable transceiver unit 102 (step 700). The voltage regulator circuit comprises a DC-DC converter, a low leakage switch, and a temperature sensitive current source.

The battery is then coupled to the DC-DC converter within the voltage regulator circuit (step 702). This coupling is done through the low leakage switch. In some embodiments, the low leakage switch is a high DC (hFE) current gain bipolar transistor.

The temperature-sensitive current source senses a temperature (step 704). In some embodiments, the temperature-sensitive current source includes a thermistor.

In step 706, the base drive current to the low leakage switch is adjusted based upon the temperature sensed in step 704 by the temperature sensitive current source. In some embodiments, the low leakage switch is a bipolar transistor. The current gain of the low leakage switch decreases when temperature decreases, and therefore an increase in base drive current is needed.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A trainable transceiver unit comprising:
   a transceiver circuit configured to reproduce and transmit control signals for operating a plurality of remote electronic devices;
   a user input device configured to accept user input;
   a battery; and
   a voltage regulator circuit comprising:
      a DC-DC converter configured to step up the battery voltage level;
      a low leakage switch configured to couple the battery and the DC-DC converter; and
      a temperature-sensitive current source configured to increase the base drive current from the battery to the low leakage switch when a current gain of the low-leakage switch decreases from a decrease in temperature;
   wherein the battery is configured to power the transceiver circuit, the user input device, and the voltage regulator circuit.

2. The trainable transceiver unit of claim 1, wherein the DC-DC converter is a boost converter.

3. The trainable transceiver unit of claim 1, wherein the low leakage switch is a high DC current gain bipolar transistor, configured so that the current source is coupled to the base of the bipolar transistor, the battery is coupled to the emitter of the bipolar transistor, and the DC-DC converter is coupled to the collector of the bipolar transistor;
   wherein the battery voltage level and the current gain of the low leakage switch decreases with a decrease in temperature, causing the DC-DC converter to draw more current to provide the required output power and the low leakage switch to require more base drive current; and
   wherein system efficiency is improved through adjusting, by the temperature-sensitive current source, the base drive current available to the low leakage switch as a function of temperature.

4. The trainable transceiver unit of claim 1, wherein the temperature-sensitive current source comprises a thermistor and a bipolar transistor, wherein the bipolar transistor is configured as a current source.

5. The trainable transceiver unit of claim 4, wherein the thermistor is thermally coupled to the battery.

6. The trainable transceiver unit of claim 1, wherein when a temperature of the battery drops below a threshold, the current source is configured to turn on the low leakage switch; and
   the low leakage switch is configured to allow the DC-DC converter to draw current; and the DC-DC converter is configured to maintain a steady voltage level.

7. The trainable transceiver unit of claim 1, wherein when a user input is received, the low leakage switch is configured to allow the DC-DC converter to draw current; and
   wherein the DC-DC converter is configured to maintain a steady voltage level.

8. The trainable transceiver unit of claim 1, wherein the battery is configured to power only the trainable transceiver unit.

9. The trainable transceiver unit of claim 1, wherein the battery is a long-life battery configured for performance at a range of temperatures at which the vehicle operates.

10. The trainable transceiver unit of claim 1, wherein the trainable transceiver unit is further configured for mounting in a vehicle.

11. The trainable transceiver unit of claim 1, further comprising a microcontroller and a display, wherein the microcontroller is configured to monitor an amount of energy remaining in the battery and cause the display to present an indication of the amount of energy remaining.

12. A power assembly for a trainable transceiver comprising:
   a battery; and
   a voltage regulator circuit comprising:
   a DC-DC converter;
   a low leakage switch configured to couple the battery and the DC-DC converter; and
   a temperature-sensitive current source configured to affect the base drive current, from the battery, to the low leakage switch;
   wherein the temperature-sensitive current source increases the base drive current available to the low leakage switch in response to a decrease in a current gain of the low leakage switch from a decrease in temperature.

13. The power assembly of claim 12, wherein the temperature-sensitive current source comprises a thermistor and a bipolar transistor, wherein the bipolar transistor is configured as a current source.

14. The power assembly of claim 13, further comprising at least one resistor coupled to the bipolar transistor, wherein the at least one resistor is configured to tune a voltage at the base of the bipolar transistor to obtain a desired temperature versus current characteristic.

15. The power assembly of claim 13, wherein the temperature-sensitive current source includes a high DC current gain bipolar transistor, configured so that the current source is coupled to the base of the bipolar transistor, the battery is coupled to the emitter of the bipolar transistor, and the DC-DC converter is coupled to the collector of the bipolar transistor.

16. The power assembly of claim 13, wherein the DC-DC converter is a boost converter.

17. The power assembly of claim 16, further comprising at least one boost capacitor and at least one slowing capacitor, wherein the at least one boost capacitor is configured to provide a low impedance power input to the boost convert and to reduce unwanted RF emissions, and wherein the at least one slowing capacitor is configured to slow the turn on of the bipolar transistor to reduce inrush current into the at least one boost capacitor.

18. The power assembly of claim 12, further comprising at least one resistor coupled to the DC-DC converter, wherein the at least one resistor is configured to filter for spikes that may arise from the operation of the voltage regulator circuit.

19. The power assembly of claim 12, wherein when a temperature of the battery drops below a threshold, the temperature-sensitive current source is configured to turn on the low leakage switch;
 wherein the low leakage switch is configured to allow the DC-DC converter to draw current; and
 wherein the DC-DC converter is configured to maintain a steady voltage level.

20. The power assembly of claim 12, wherein the battery is a lithium-carbon monofluoride cell, lithium manganese dioxide cell, or lithium-thionyl chloride cell.

* * * * *